United States Patent [19]

Jaccard

[11] 4,051,208
[45] Sept. 27, 1977

[54] PROCESS FOR THE CONVERSION OF LIQUID PHASES OF NON-METALLIC SUBSTANCES, ESPECIALLY POLYMERIZABLE OR CRYSTALLIZABLE SUBSTANCES, INTO SOLID PHASES

[75] Inventor: Roland Jaccard, Basel, Switzerland

[73] Assignee: Ciba-Geigy Corporation, Ardsley, N.Y.

[21] Appl. No.: 626,915

[22] Filed: Oct. 29, 1975

Related U.S. Application Data

[60] Division of Ser. No. 527,422, Nov. 26, 1974, abandoned, which is a continuation of Ser. No. 351,965, April 17, 1973, abandoned.

[51] Int. Cl.² .................... C08L 61/20; B22D 23/08
[52] U.S. Cl. ........................................ 264/5; 264/216;
23/273 R; 23/295 R; 260/29.4 R; 156/616 R;
62/345; 425/329; 425/321; 425/371
[58] Field of Search .............. 23/273 F, 273 R, 295;
62/345; 425/329, 320, 377, 321; 264/216, 165,
212, 5, 140; 34/111; 159/7, DIG. 5; 260/29.4 R,
29.4 UA; 156/616 R

[56] References Cited

U.S. PATENT DOCUMENTS

| 2,730,516 | 1/1956 | Luen | 260/29.4 R |
| 2,765,287 | 10/1956 | Aycock | 260/29.4 R |
| 2,803,236 | 10/1957 | Dickinson | 23/273 F |
| 3,487,143 | 12/1969 | Bergvall | 264/216 |
| 3,558,759 | 1/1971 | Sarem | 264/5 |
| 3,586,654 | 6/1971 | Lerman | 264/5 |

FOREIGN PATENT DOCUMENTS

| 72,683 | 1/1944 | Czechoslovakia | 425/329 |
| 1,955,800 | 5/1971 | Germany | 423/329 |
| 486,538 | 11/1953 | Italy | 425/329 |

*Primary Examiner*—Stephen J. Emery
*Attorney, Agent, or Firm*—Wenderoth, Lind & Ponack

[57] ABSTRACT

A system for the conversion of liquid phases of non-metallic substances into solid phases, especially polymerizable or crystallizable substances, provides a reaction chamber in the form of an upstanding substantially tubular-shaped hollow body, at the upper end of which there is introduced the liquid phase and at the lower end of which there is continuously withdrawn the solid phase. The reaction chamber is enclosed at least at its upper region containing the liquid phase by a jacket of polygonal cross-section, wherein the wall sections of the chamber which in cross-section is polygonal are formed in each case by a run of an endless band which bears against the associated jacket section, each such band moving continuously downwardly by means of the aforesaid run and being substantially synchronously driven with the remaining bands.

4 Claims, 2 Drawing Figures

PROCESS FOR THE CONVERSION OF LIQUID PHASES OF NON-METALLIC SUBSTANCES, ESPECIALLY POLYMERIZABLE OR CRYSTALLIZABLE SUBSTANCES, INTO SOLID PHASES

This is a division of application Ser. No. 527,422, filed Nov. 26, 1974, now abandoned, which is a continuation of application Ser. No. 351,965, filed Apr. 17, 1973, now abandoned.

BACKGROUND OF THE INVENTION

The present invention relates to a new and improved process for the conversion of liquid phases of non-metallic substances into solid phases, especially polymerizable or crystallizable substances.

In different publications it has already been proposed in the art, for the purpose of converting liquid phases into solid phases, to spread the liquid phase onto a surface and to peel off such surface the layer of the solid phase which is formed after solidification. According to one prior art proposal there is contemplated a drum member which rotates about a horizontal axis, and at the inner jacket surface of such drum member there is spread out the liquid phase. Generally considered, the conversion process proceeds continuously insofar as the layer of the solid phase is continually formed at its rear end in the direction of rotation of the drum. However, when considering the operation of this system more closely, it will be recognized that within the liquid phase the conversion process does not actually proceed with the same continuity and uniformity at localized regions. This is so because the liquid phase, apart from its length which is determined by the dimensions of the drum member, also possesses a relatively large width and depth, so that there is always present a relatively large quantity of liquid phase at which there does not exist a conversion front or transition zone. Quite to the contrary, the conversion process occurs at random localities and at random points of time at spaced zones, which tend to spread as the conversion process proceeds and finally merge together. The processes which occur during the conversion or transformation of course are not without influence upon the homogeneity and other properties of the solid phase, the quality of which in any event is likewise irregular owing to the irregularity of the conversion process. Moreover, it is not possible to counteract such by reducing the quantity of liquid phase in the drum member. This is so because, among other things, in actual practice such can only be carried out with extreme difficulty, and furthermore, by resorting to such measures productivity would fall considerably below the limits of economical production. On the other hand, with the use of such drum member the production capacity cannot be randomly increased without even more intensely affecting the properties of the solid phase.

These drawbacks cannot be counteracted through the use of equipment of the type which has become known to the art through French Pat. No. 2,104,041, wherein a reaction chamber or compartment is provided in the form of an upstanding tubular-shaped hollow body, at the lower end of which there is continuously removed the solid phase with the aid of withdrawal rollers. Firstly, removal of the solid phase from the reaction compartment with the aid of withdrawal rollers requires considerable tensional strength of the material, and which in the case of those substances which normally come under consideration is just not present as a general rule. Secondly, with equipment of this type, numerous factors which are dependent upon coincidence play a decisive role, and the unpredictability of which absolutely precludes influencing the conversion process by means of the equipment. This is also then the case if, and as will be likewise apparent from the aforementioned French patent, there is utilized instead of the withdrawal rollers, in the solid phase a core in the form of a flexible traction element.

SUMMARY OF THE INVENTION

Hence, it is a primary object of the present invention to provide an improved process for the conversion or transformation of liquid phases of non-metallic substances into solid phases in a manner not associated with the aforementioned drawbacks and limitations of the prior art proposals.

Another and more specific object of the present invention aims at insuring that the conversion will not occur in an uncontrolled manner as was heretofore the case, but rather proceeds in the manner of a conversion front or transition zone and, on the other hand, renders possible, in comparatively the same or even shorter times, the conversion of larger quantities of the liquid phase without impairing the quality of the resultant solid phase.

The solution of this last-mentioned objective has for its preconditions that starting with a layer of the liquid phase the latter is introduced as a function of the progression of the phase change which occurs in such layer and that above the solid phase there is always maintained a layer of liquid phase.

Now in order to realize such preconditions and, starting with the aforementioned French patent, the invention contemplates that the reaction chamber, at least at its upper region containing the liquid phase, is enclosed by a jacket of polygonal cross-sectional configuration, and wherein the wall sections of the chamber which is polygonal in cross-section are formed in each instance by the run of a respective endless band, each such band run bearing against the associated jacket section, and each band revolving moves with the aforesaid run continuously downward and is driven in synchronism with the remaining bands.

If there is employed during the conversion of liquid phases into solid phases such a system, then owing to the direct action of the bands upon the solid phase, and which action is no longer left to coincidence, there is insured that the solid phase will build up so-to-speak from the bottom towards the top, whereby the liquid phase, always in the form of a thin layer, is located above the solid phase. This thin layer of liquid phase is now subjected to the conversion process practically over its entire extent, so that there is formed a conversion of transformation front and the solid phase continuously grows towards the top whereby such is uniformly influenced by such growth. In this manner the production capacity can be readily increased up to the limits determined by the transformation speed of the relevant liquid phase and nonetheless there can be obtained homogeneity and uniformity of the remaining properties of the solid phase. In fact it has been surprisingly found that in certain cases the quality of the solid phase can be increased beyond that degree which could be absolutely expected in consideration of the uniformity of the conversion process. Even if one does not consider the extreme favorable situations, it has been found that the solid phases formed during the conversion process in accordance with the invention exhibit special properties in contrast to the heretofore known state of the art.

The inventive process is suitable for carrying out practically all phase conversion or transformation processes from liquid into solid phase. Thus, for instance, there can be carried out polycondensation reactions, polymerization reactions, precipitation reactions or crystallization; in particular vinyl polymerization, in which liquid monomers, if desired after catalytic initiation and/or thermal action, are converted into solid polymers or co-polymers, or precipitation reactions, in which there can be fabricated highly dispersed silicic acid from sodium silicate and acidic solutions or aluminum silicate from sodium silicate and aluminum sulfate.

The inventive process is particularly suitable for the continuous performance of the method of fabricating highly dispersed, cross-linked condensation polymers formed on the basis of urea and/or melamine and formaldehyde. One such process has been disclosed for instance in Belgian Pat. No. 730,186, and essentially consists in transforming into a cross-linked gel an aqueous solution of a pre-condensate formed of urea and formaldehyde in the presence of a protective colloid through the addition of sulfamic acid or a water soluble ammonium hydrogen sulfate of the formula

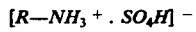

$[R-NH_3^+ \cdot SO_4H]^-$ wherein $R$ is a hydrogen atom or an organic radical which does not impair the water solubility, such as in particular an alkyl-, cycloalkyl-, hydroxyalkyl-, aralkyl or aryl radical, wherein the ratio of formaldehyde:urea is greater than 1 latest at the moment of the formation of the gel, and that the obtained gel is comminuted, dried and disagglomerated.

A decisive advantage of the process of the invention resides in the fact that, as already mentioned, the reaction product, especially the gel, during and directly after its solidification, is not subjected to any or only very slight mechanical loads. For many products, such as for instance the aforementioned condensation polymers, this is a decisive prerequisite for the quality of the product.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
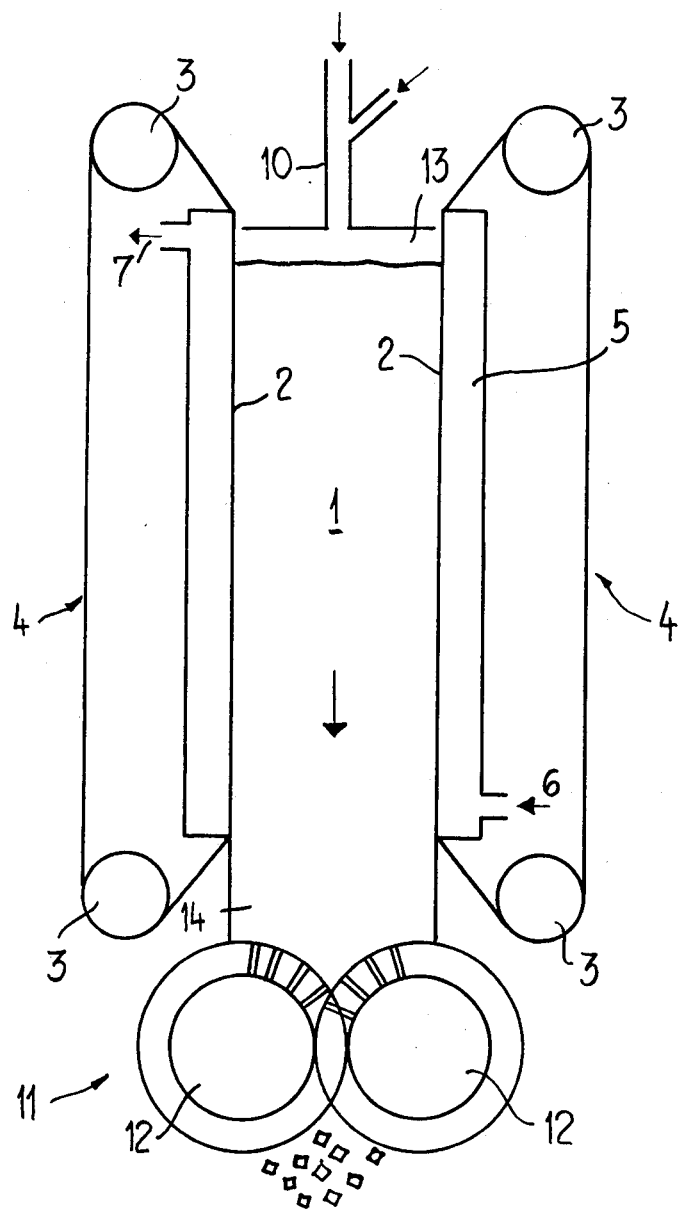
FIG. 1 is a schematic longitudinal sectional view of an exemplary embodiment of apparatus employable in carrying out the process of the present invention.

Describing now the drawings and as will be apparent by referring to the same, the exemplary embodiment of an apparatus employable in carrying out the process of the invention includes a reaction chamber or compartment 1 which is in the form of a hollow space of quadratic or square cross-section which extends from the bottom towards the top and bounded at all sides but open at both ends. The boundary walls of the reaction chamber 1 are formed in each case by one run 2 of a respective endless band 4 which is guided about deflecting rollers or rolls 3. For the sake of preserving clarity in illustration, there have only been shown in FIG. 1 two such endless bands, whereas in FIG. 2 on the other hand, all four such bands 4 have been depicted. The band runs 2 forming the chamber walls are enclosed by a double-wall heating or cooling jacket 5 and supported by the inner wall thereof. Accordingly, the jacket 5 forms a quadratic or square prismatic throughpassage when viewed in cross-section. At locations 6 and 7 the jacket 5 is connected to the circulation system for a heat carrier or transfer medium.

Figure 2:
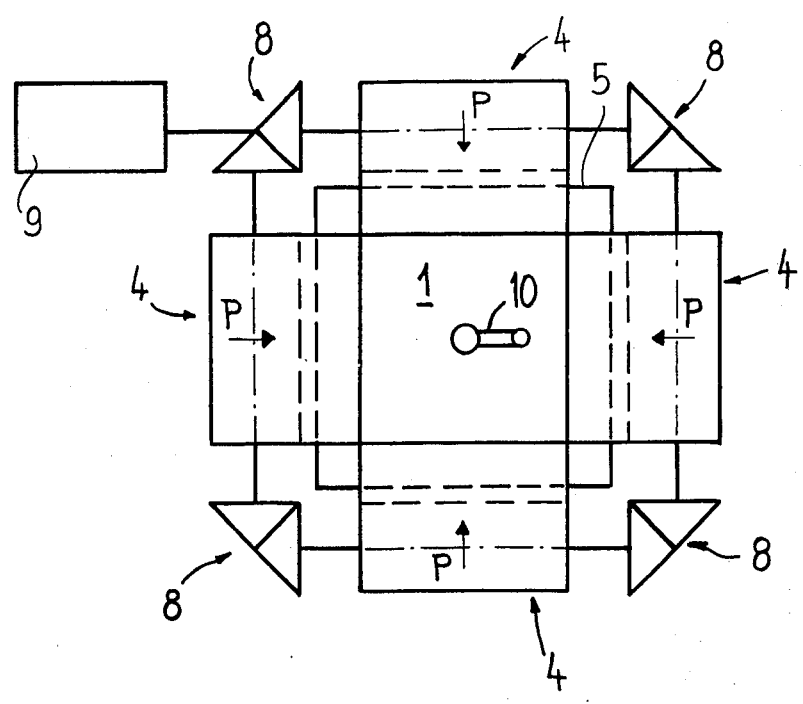
FIG. 2 is a schematic plan view of the apparatus shown in FIG. 1.

As best seen by referring to FIG. 2, the rollers 3 are drivingly connected with one another by miter or bevel gearing 8 and furthermore they are in driving connection with a suitable drive motor 9. As will be recognized from such arrangement and additionally indicated in FIG. 2 by the arrows P, during revolving movement of the bands 4 and the runs 2 thereof collectively more downward. As will be more fully explained hereinafter, as a result thereof the solid phase which is formed in the reaction chamber 1 will be ejected downwardly out of such chamber. For this purpose it is not necessary that all of the bands be driven by the motor 9. Quite to the contrary, it is possible to arrange at least one band so as to be free-running and to entrainably drive the same via the solid phase.

Above the reaction chamber 1 there is located a controllable infeed line or conduit 10 for the liquid phase, and which infeed line, in the embodiment under consideration, is designed as a mixing nozzle for admixing or combining two liquid components into a liquid phase. Beneath the compartment or chamber 1 there is provided a comminution mechanism 11 which, in the embodiment under discussion, will be understood to consist of for instance two meshing toothed rollers 12.

When carrying out the process of the invention by used of the described equipment, the reaction chamber is preferably closed at the region of its upper end by a non-illustrated stopper which tightly bears against the runs 2 of the bands 4. Above this stopper there is then produced a layer 13 from the liquid phase. At this layer 13 there now occurs the conversion of the liquid phase into the solid phase. As a function of the progression of the conversion or transformation process, there is continuously infed the liquid phase, so that above the prevailing and upwardly growing solid phase there is always present a layer of such liquid phase. At the same time, the bands 4 are placed into movement, and specifically likewise as a function of the conversion process which proceeds, so that the layer of liquid phase always is located at the upper terminal region of the reaction chamber and the solid phase together with the stopper can be ejected or displaced downward.

This stopper can be designed as a reusable component of the equipment, in which case it will be caught at the lower end of the chamber and must be removed. Furthermore, it is conceivable to employ as the stopper the solid phase itself, wherein then, for instance, in the case of interruption in operation the chamber 1 is not completely emptied in order to be able to employ as the stopper the therein located solid phase during the next starting operation.

The solid phase which is continuously expelled out of the chamber or compartment, and which solid phase has been conveniently designated in FIG. 1 by reference character 14, in the event such is required, and as shown in the embodiment under consideration, can be directly fed into the comminution mechanism 11.

If with the conversion there is necessary or desirable the heating or cooling action of the jacket 5, then it can happen that the solid phase (in contrast to the illustration of FIG. 1) possesses a concave upper surface, namely an upper surface which descends from all sides towards the center, this being particularly then the case if the solid phase is ejected relatively quickly and/or the chamber has a relatively large cross-section. Even in this situation there is formed, however, a (concave) conversion of transformation front and the conversion process proceeds from the inside towards the outside and from the bottom towards the top uniformly. To emphasize this point once again, this is always then the case if above the solid phase, in accordance with the progressing conversion process, there is always maintained a layer of the liquid phase. The word "layer" as used in the context of this disclosure is to be understood in its broadest sense, and particularly that the depth of the liquid phase which floats above the solid phase is limited in comparison to the surface extent of such liquid phase and in any event is essentially only governed by the requirement that the solid phase is always maintained "covered" by liquid phase.

With equipment designed according to the embodiment of FIGS. 1 and 2 and with a chamber of 500 mm. side length and about 200 mm. useful length, there were carried out, for instance, the following operations: the fabrication of highly dispersed condensation polymers of urea and formaldehyde with 30 m²/g surface and 40 g/liter bulk weight as follows:

A urea formaldehyde precondensate is continuously admixed via the nozzle 10 with sulfamic acid solution in a weight ratio of 2.93:1 and sprayed into the chamber 1 which has been preheated to a temperature of 65° C., the speed of advance of the bands amounting to about 1 meter per hour. It was possible to dispense with any residence time of the gel in a curing tower.

In the same piece of equipment, it was also possible, among other opertions, to carry out the following operation: Fabrication of a silicic acid gel:

At the mixing nozzle 10 there was mixed cold 30% sulfuric acid and a sodium silicate solution in a volume ratio of 1:4 and sprayed into the compartment, the temperature of which was maintained for instance at about 120° C. by for instance tensioned vapor and the feed of the bands was adjusted to about 50 cm/hour. In this case there was formed a solid silicic acid gel which did not need to be post-treated in a curing tower.

While there is shown and described present preferred embodiments of the invention, it is to be distinctly understood that the invention is not limited thereto, but may be otherwise variously embodied and practiced within the scope of the following claims.

What is claimed is:

1. A process for the fabrication of a condensation polymer based on urea and/or melamine and formaldehyde, said process comprising:
   providing a vertically extending hollow reaction chamber having a horizontal cross-section shape in the form of a polygon and having a plurality of flat vertical walls each formed by a vertical run of a separate revolving endless band;
   initially filling the upper end of said chamber with a liquid phase of a mixture of an aqueous solution of a pre-condensate of urea and/or melamine and formaldehyde in the presence of a protective colloid with a solution of sulphonic acid or a water-soluble ammonium hydrogen sulphate of the formula $[R-NH_3](+).[SO_4H](-)$, wherein R is a hydrogen atom or an organic radical which does not adversely affect the water-solubility, and allowing said liquid phase to convert to a solid phase;
   supplying, at a rate dependent on the speed of conversion of said mixture from said liquid phase to said solid phase, a sufficient amount of said liquid phase into said chamber to maintain a thin layer of said liquid phase on top of said solid phase formed in said chamber; and
   continuously passing said solid phase from said chamber and simultaneously comminuting said solid phase as it passes from said chamber.

2. A process as claimed in claim 1, wherein said step of causing comprises synchronously driving said bands at the same speed.

3. A process as claimed in claim 1, further comprising providing a jacket having a horizontal cross-sectional shape in the form of a polygon surrounding said chamber with each of said vertical runs bearing against and being supported by a second of said jacket, and passing a heating medium through said jacket.

4. A process as claimed in claim 1, further comprising providing a jacket having a horizontal cross-sectional shape in the form of a polygon surrounding said chamber with each of said vertical runs bearing against and being supported by a section of said jacket, and passing a cooling medium through said jacket.

* * * * *